United States Patent Office 3,325,060
Patented June 13, 1967

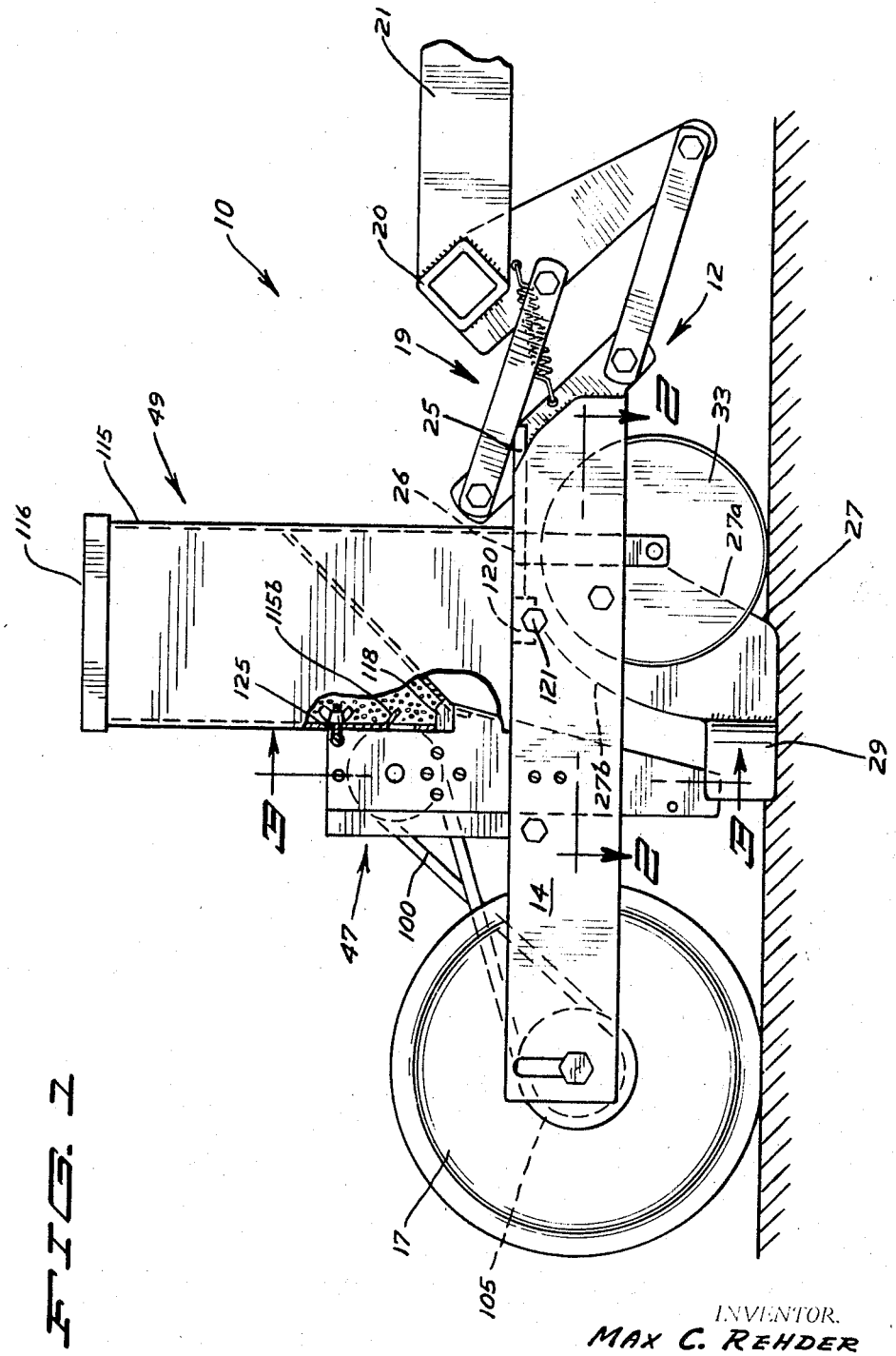

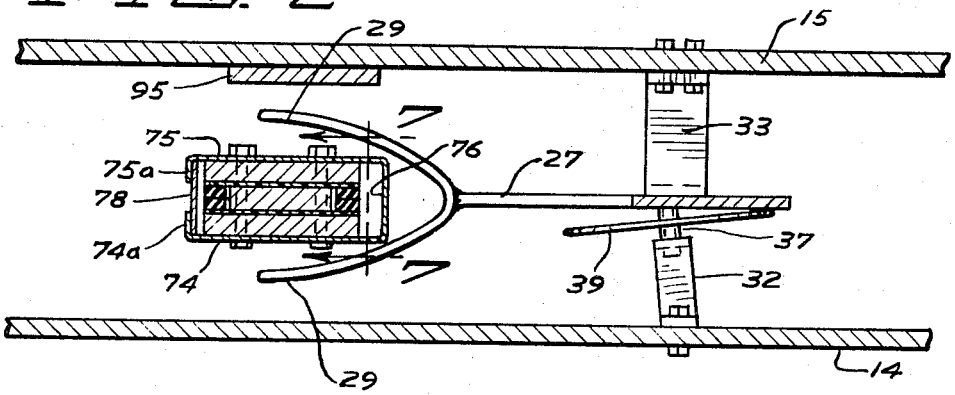
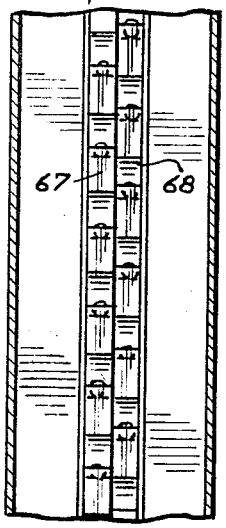
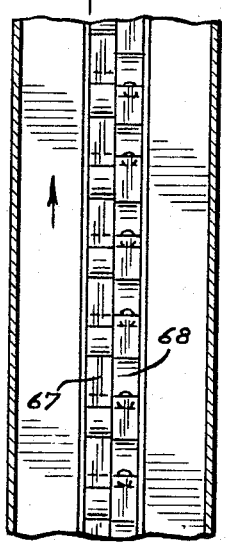

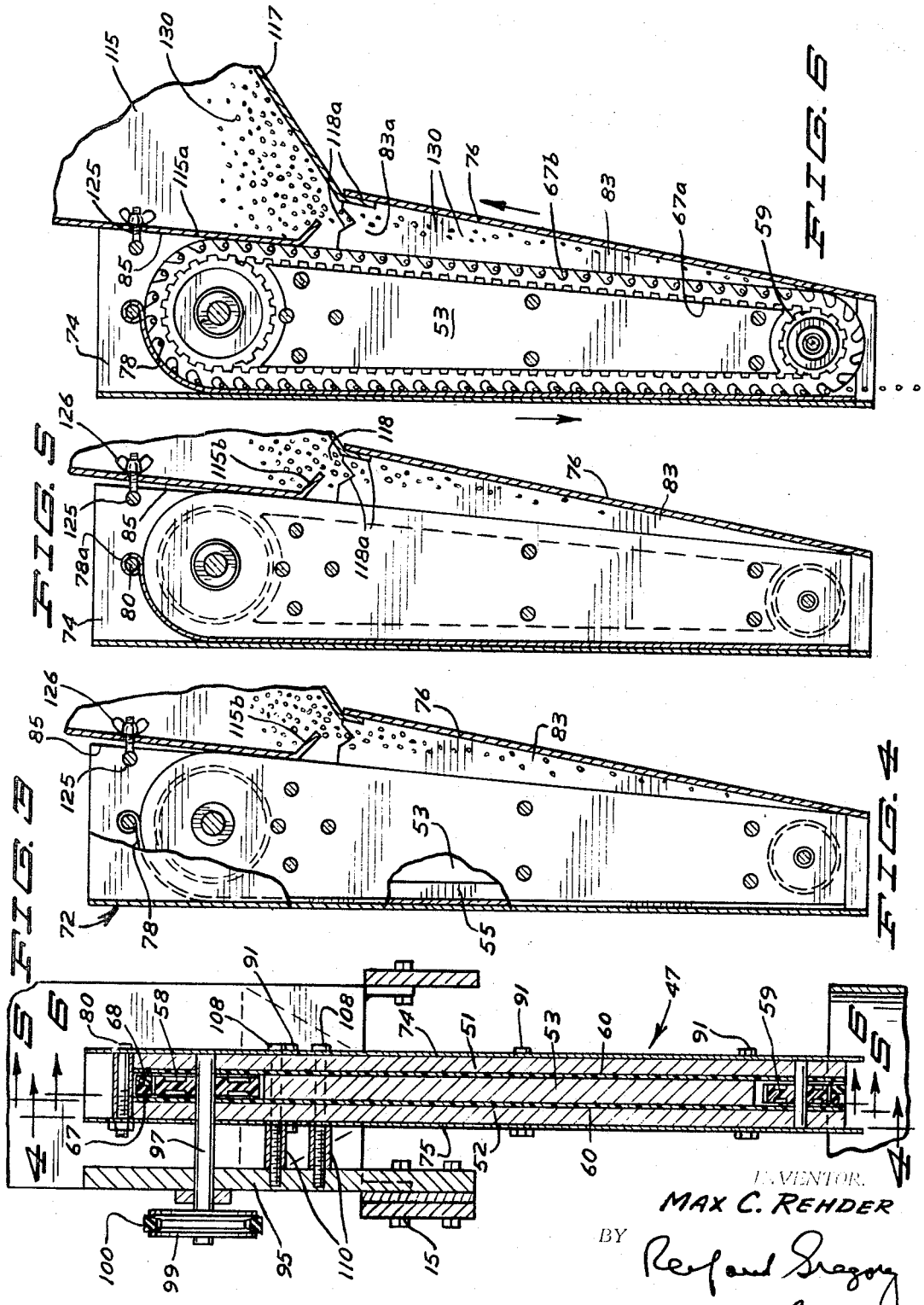

3,325,060
SEEDING APPARATUS
Max C. Rehder, 510 7th Ave. S.,
Moorhead, Minn. 56560
Filed Sept. 13, 1965, Ser. No. 486,727
3 Claims. (Cl. 222—371)

This invention relates to improvement in a seeding apparatus, and more particularly to a seeding mechanism adapted to receive seeds out of a hopper and to convey and deposit individual of such seeds for planting. It is desirable to have individual seeds planted as for sugar beets to avoid the need for subsequent thinning of plants.

It is an object of this invention therefore to provide a seeding apparatus particularly arranged to deposit for planting single seeds at regular intervals.

It is another object of this invention to provide a seeding apparatus comprising a seed supply chamber integral with a seeding mechanism and a hopper having a substantial supply of seed in communication with said supply chamber.

It is also an object of this invention to provide a seeding mechanism comprising a flexible unitary seed dispensing belt having pockets thereabout and being adapted to accommodate a plurality of such belts in juxtaposed position with said belts having their respective pockets in staggered relation.

These and other objects and advantages of the invention will be set forth in the following description made in connection with the accompanying drawings in which like reference characters refer to similar parts throughout the several views and in which:

FIG. 1 is a view on a reduced scale in side elevation of the apparatus herein with portions thereof being broken away and some portions being shown in dotted line;

FIG. 2 is a broken view in horizontal section taken on line 2—2 of FIG. 1 as indicated;

FIG. 3 is a broken view in vertical section taken on line 3—3 of FIG. 1 as indicated;

FIGS. 4, 5 and 6 are broken views taken on lines 4—4, 5—5 and 6—6 respectively of FIG. 3 as indicated;

FIG. 7 is a broken view in vertical section taken on line 7—7 of FIG. 2 as indicated;

FIG. 8 is a view in vertical section taken on line 8—8 of FIG. 7 as indicated;

FIG. 9 is a view similar to that of FIG. 7 showing a modification thereof; and

FIG. 10 is a view in vertical section taken on line 10—10 of FIG. 9 as indicated.

Referring to the drawings, a seeding apparatus 10 is indicated comprising generally a basic frame 12 formed having spaced horizontal side frame members 14 and 15 having journaled therebetween a rearwardly disposed packing wheel 17. Extending forwardly of said frame members is a spring loaded connecting linkage 19 secured to a transverse supporting member or bar 20 from which a pull bar 21 will extend to an appropriate pulling means such as a tractor. It will be understood that a plurality of units of the apparatus 10 may be disposed in transverse spaced relation connected to the bar 20 to provide a multiple row seeding apparatus.

Extending between the upper forward end portions of said frame members and secured thereto as by welding, is a plate member 25 having a flat horizontal rearwardly extending portion 26 which in turn has a downwardly and rearwardly angled portion 27 disposed substantially in a vertical plane and parallel to said frame members. Said portion 27 forms a blade which will be of sufficient length to penetrate the soil a desirable depth to cut a furrow to receive seed. Said blade preferably will penetrate the ground or soil on the order of one and one-half inches.

As viewed in FIG. 1, said blade has a straight downwardly rearwardly inclined leading edge portion 27a and an arcuate trailing edge portion 27b. Rigid with the bottom portion of said blade 27 as by welding, is a rearwardly extending bifurcated shoe 29, as viewed in plan in FIG. 2, which serves to widen the furrow made by said blade 27 and to shelter dropping seeds, as will be described.

With further reference to FIG. 2, strap-like brackets 32 and 33 extend inwardly from said frame members 14 and 15. Said bracket 33 at its inner end attaches to the blade 27. Said bracket 32 is angled somewhat rearwardly. Disposed at a slightly angled relation to said blade 27 and journaled onto a stub shaft 37 disposed between the free end of said bracket 32 and an adjacent portion of said blade 27 is a disk 39 which is contacted at its forward rim portion by the leading edge of said blade 27 in a blade cleaning action, and said disk co-operates with said blade to open a furrow in the soil.

The structure above presented has been but briefly described. Thus this structure is conventional and forms no part of the invention herein but provides a framework for supporting the seeding mechanism hereinafter to be described and which structure embodies the invention disclosed herein.

In connection with the structure above described, there is provided a seeding mechanism comprising a seed dispensing member 47 and a hopper 49.

With particular reference to FIGS. 2–6, said seed dispensing member comprises, as here shown, a pair of elongated plate members 51 and 52 somewhat tapered in width having sandwiched therebetween a spacer plate member 53 of somewhat shorter length and narrower width, whereby a peripheral groove or channel 55 is formed about said plate member 53 and between the projecting edge portions of said plate members 51 and 52. Said plate members 51 and 52 have rounded upper end portions and squared bottom portions. Said spacer member 53 has concavely curved end portions.

Disposed at either end of said spacer plate member 53 and appropriately journaled between said plate members 51 and 52 are sprocket wheels 58 and 59 of respective sizes to be recessed within the adjacent edge portions of said plate members 51 and 52 to have said channel 55 extend thereover.

Underlying the inner sides of said plate members 51 and 52 are substantially friction free wear plates 60 which may be suitably formed of graphite impregnated nylon. Said wear plates form liners for the respective sides of said channel 55.

Disposed within said channel 55 and passing over said sprocket wheels 58 and 59 is a seed carrier which may be variously formed but is here shown made up of a pair of endless molded resilient belts 67 and 68. Said belts are identical in structure. Said belt 67 is shown having an inner ribbed surface 67a for mating with the sprocket wheels 58 and 59. Pockets 67b are formed on the outer surface of said belt 67. Said pockets as shown on an enlarged scale in FIGS. 8 and 10 are disposed at an angle with regard to the horizontal and respectively have upwardly inclined lower and upper walls with regard to the upper run of the belt. Said pockets are particularly designed to receive and retain only a single seed each. As indicated in FIGS. 7 and 8, said belts 67 and 68 will be juxtaposed in such a manner as to have their respective pockets in a staggered relation. It will be understood that the pockets of said belts will be spaced so as to drop or discharge seeds at certain desired regular intervals with regard to the speed at which the apparatus is moved. It is quite obvious that with one belt reversed so that the walls of its pockets incline downwardly on its upper run, that this belt will pick up no seeds from the hopper to be described and hence seeds from only one belt will be dispensed and at double the interval that is present with both belts dispensing seeds from their respective pockets.

Enclosing said plate members 51 and 52 is a housing 72 comprising side walls 74 and 75, a front wall portion 76, and spaced rear walls 74a and 75a.

Underlying said rear walls 74a and 75a is a flat strip or plate member 78 which overlies the adjacent portion of the channel 55 and forms an enclosing wall for the belt pockets passing thereunder. Said member 78, as shown in FIGS. 5 and 6, overlies the upper curved portions of the plate members 51 and 52 approximately midway thereof, at which point said plate member has its end portion 78a reversely curved to form a sleeve which is engaged by a bolt 80 disposed through aligned apertures in the housing 72.

Said side walls 74 and 75 are formed to have an upwardly inclined forwardly projecting portion extending substantially two-thirds the height of said housing to form a seed feeding chamber 83. Said chamber has an open top 83a. The front wall portion 76 engages the leading bottom edge portions of the plate members 51 and 52 and is sufficiently close to the belt portion passing thereby to effectively seal the bottom of chamber 83 against any seed loss. Said side walls 74 and 75 have an open front wall 85 above said chamber 83.

Said plate members 51–53 and said housing 72 thereabout are secured together by a plurality of spaced transverse bolts 91 as indicated.

Upstanding from said frame member 15 is a plate bracket 95 adapted to have a shaft 97 disposed therethrough into the hub of said sprocket wheel 58 for driving engagement therewith. A pulley 99 is carried at the free end of the said shaft over which a belt 100 passes, with said belt also passing over pulley 105 carried on the axle of said packing wheel 17 in a conventional manner.

Said seeding mechanism member is secured in operating position to said plate bracket by bolts 108 passing transversely through said seeding mechanism member and being threaded into a pair of tapped studs 110 rigid with said plate bracket and adapted to support said seeding mechanism member in spaced relation thereto. Said seeding mechanism will be spaced substantially centrally between said frame members 14 and 15.

In connection with said supply chamber 83 is a hopper 115 indicated here as being substantially parallelipiped in form and having a removable cover 116. Said hopper has a downwardly inclined inner wall 117 converging upon an opening 118 in the front wall 115a, with said opening being in the form of a vertical slot in said front wall and extending into the converging wall 117 with depending lip portions 118 being formed from said wall. Said lip portions are particularly designed to be seated within said opening 83a, as indicated in FIGS. 4–6. The vertical portion of said slot 118 will be aligned between the walls 74 and 75 above said chamber 83.

Said hopper has a width to be disposed between said frame members 14 and 15 and has a depending notched flange 120 at either side thereof adapted to be seated as within a slotted bracket in adjacent side portions of said frame members 14 and 15 with said notched flanges being seated upon positioning and supporting bolts 121. The seating of said hopper represents conventional structure.

A T-shaped eyebolt 125 is secured between upper portions of said walls 74 and 75 by an appropriate bolt and extends through an aligned aperture in the adjacent portion of said wall 115a of said hopper. A wing nut 126 is provided to secure the shank of said eyebolt within said hopper.

A baffle 115b extends inwardly of said wall 115a to partially overlie said opening 118.

Seeds 130 are indicated as being present in said hopper 115 and within said seed chamber 83.

Operation

The seed carrier here disclosed comprises a pair of molded belts having their pockets staggered and spaced such that at a given travel speed seeds will be dispensed at desired regular intervals. The pockets, it will be noted, are slanted or inclined upwardly on the upper run of the belt and are inclined downwardly on the discharge run of the belt. The belt is preferably molded of a flexing material. Thus the belt in passing over the upper pulley flexes whereby the pockets are opened slightly to better seat the seeds therein in preparation for the discharge run. Referring to FIGS. 9 and 10, it is shown that if one belt is reversely positioned whereby the pockets are inclined downwardly on the pickup run that no seeds will be picked up. Thus very readily one belt can be made inoperative, and with only one belt picking up and dispensing seeds, the seeding interval is doubled.

The plate member 78 is readily removed for purpose of cleaning the belts if necessary.

The seeding mechanism member 47 is readily supported by being bolted to the two projecting tapped studs extending from the plate bracket 95. The hopper 115 is supported on the bolts 121 carried by the frame members 14 and 15 and is secured to the seeding member 47 by the eyebolt 125. The entire assembly is readily installed or removed.

The hopper will carry a substantial supply of seed which will pass into the smaller supply channel 83 from which the seeds will be picked up by the belts 67 and 68. Each of the pockets will admit or receive only one seed. On the discharge run the seeds are retained in the pockets by the plate member 78.

In operating position, the lower end of the seeding mechanism 47 is disposed between the side walls of the shoe 29. The shoe widens the furrow opened up by the disks 33 and blade 27 and the seeds are deposited directly into the furrow and the furrow is immediately closed by the packing wheel 17.

The lower end of the seeding mechanism is quite close to the ground whereby seeds drop within substantial shelter of the shoe 29 and only a short distance to the ground. Thus the seeds are relatively free from atmospheric disturbances. The belts 67 and 68 in passing over the sprocket 59 flex to open up to some degree the pockets of said belts as said pockets respectively approach said sprocket. Thus the seeds in said pockets are readily discharged as the belts begin to pass over the lower half of the sprocket and there is freedom from a tendency for the seeds to stick or become jammed within a pocket.

The apparatus has been unusually successful in operation, and by providing uniform seeding has made possible substantial savings by the elimination of the need for thinning out plants.

It is seen therefore that I have provided a very simply constructed and efficiently operating seeding apparatus.

It will of course be understood that various changes may be made in the form, details, arrangements and proportions of the parts, without departing from the scope of applicant's invention, which, generally stated, consists in an apparatus capable of carrying out the objects above set forth, in the parts and combinations of parts disclosed and defined in the appended claims.

What is claimed is:
1. A seeding apparatus having in combination,
   a seeding mechanism comprising a plate-like member disposed substantially vertically in operating position,
   a channel about the periphery of said member,
   an endless carrier disposed in said channel, pockets formed about the outer side of said carrier, said pockets each defining a recess to receive and retain a single seed,
   a housing about said member arranged to leave the ends of said member unobstructed, said housing hav- ing a slotted wall closely overlying one side of said plate member, a plate member underlying said slotted wall and overlying the adjacent portion of said channel to form an outer wall for the open sides of said pockets passing thereunder, said housing having an upwardly inclined projecting portion at the side opposite said one side of said plate-like member defining a chamber having an opening thereinto, a hopper, said hopper having a slot therein adapted to overlie said opening in said chamber for communication between said hopper and said chamber, means securing said hopper and said housing, and means driving said carrier.

2. The structure set forth in claim 1, said carrier comprising a pair of juxtaposed belts, said belts having their respective pockets in staggered relation.

3. The structure set forth in claim 1, said carrier comprising a pair of juxtaposed belts, said belts having their respective pockets in staggered relation, a sprocket wheel at either end of said plate-like member having said belts pass thereover, said belts being formed of a unitary single piece construction and being particularly formed to have their respective pockets flex and spread to increase their openings both upon approaching and upon passing over said sprockets.

References Cited

UNITED STATES PATENTS

| 3,077,290 | 2/1963 | Rehder | 222—371 X |
| 3,122,283 | 2/1964 | Walters | 222—371 |

FOREIGN PATENTS

| 681,315 | 10/1952 | Great Britain. |

ROBERT B. REEVES, *Primary Examiner.*

F. H. HANDREN, *Assistant Examiner.*